(12) United States Patent
Chen

(10) Patent No.: US 6,348,167 B1
(45) Date of Patent: Feb. 19, 2002

(54) METHOD OF MAKING A SURFBOARD

(75) Inventor: Ching-Hsi Chen, Taichung (TW)

(73) Assignee: Sun Own Industrial Co., Ltd. (TW)

( * ) Notice: Subject to any disclaimer, the term of this patent is extended or adjusted under 35 U.S.C. 154(b) by 0 days.

(21) Appl. No.: 09/592,589

(22) Filed: Jun. 12, 2000

(51) Int. Cl.⁷ ............................................ B29C 44/02
(52) U.S. Cl. ......................... 264/51; 264/55; 264/157
(58) Field of Search .................... 264/51, 45.1, 55, 264/157

(56) References Cited

U.S. PATENT DOCUMENTS

| | | | |
|---|---|---|---|
| 3,818,085 A | * 6/1974 | Marsland, Jr. et al. | 264/55 |
| 4,073,844 A | * 2/1978 | Wada et al. | 264/55 |
| 4,314,954 A | * 2/1982 | Ringdal | 264/55 |
| 4,976,902 A | * 12/1990 | Oberle | 264/55 |
| 5,234,638 A | * 8/1993 | Jang | 264/46.6 |
| 5,350,544 A | * 9/1994 | Bambara et al. | 264/321 |
| 5,417,898 A | * 5/1995 | Volpi et al. | 264/51 |
| 5,560,877 A | * 10/1996 | Yung et al. | 264/321 |
| 5,569,420 A | * 10/1996 | Van Horne | 264/51 |
| 5,688,454 A | * 11/1997 | Chi | 264/321 |
| 5,851,462 A | * 12/1998 | Chen | 264/55 |

FOREIGN PATENT DOCUMENTS

| | | | | |
|---|---|---|---|---|
| JP | 61-53030 | * | 3/1986 | 264/55 |
| JP | 62-21525 | * | 1/1987 | 264/55 |

* cited by examiner

Primary Examiner—Allan R. Kuhns
(74) Attorney, Agent, or Firm—Troxell Law Office PLLC

(57) ABSTRACT

A method for making a surfboard includes six steps of processes. The first step is to prepare and cut plastic plate material into a panel. The second step is to place it in a mold to hotly press to let the panel foam half. The third step is to take the half-foamed prototype out of the mold to let it continue to foam to expand. The fourth step is to place the fully foamed prototype in a baking device to heat it into an almost completed surfboard. The fifth step is to place it in a cooling mold to cool and harden to become a finished surfboard. The sixth step is to take the finished surfboard out of the cooling mold. Thus the method can shorten the time for making a surfboard and save material waste.

5 Claims, 5 Drawing Sheets

METHOD OF MAKING A SURFBOARD

BACKGROUND OF THE INVENTION

This invention relates to a method for making a surfboard, particularly to one effectively shortening time for making, producing no material waste of the sides, and formed integral.

Applicant of the invention has acquired U.S. Pat. of No. 5,851,462 titled the same as this invention, wherein the method uses ethylene vinyl acetate (EVA) copolymer, poly ethylene (PE) or their mixer to make one panel, which is then placed in a mold cavity of a first mold device to hotly press, and then to let the panel foam and expand to a prototype after the panel is removed from the first mold device. Then the prototype continues to expand to the volume of 6-10 times larger than that of the prototype taken out of the first mold device.

Then the expanded foam prototype of a surfboard is put in the cavity of a second mold devices for hot pressing to form a surfboard with a tapered nose and tapered sides and a concave curved tail. Then cold water is poured in the second mold device to cool the surfboard and taken out of the second mold device.

However, two hot-pressing processes for making a surfboard need much time and are rather complicated.

SUMMARY OF THE INVENTION

A first objective of the invention is to offer a method for making a surfboard by forming it integral, lessening its making processes, shortening time in making and the number of workers needed.

A second objective of the invention it to offer a method for making a surfboard, wherein the prototype is made to foam for a second time in a baking device, simplifying making processes to enhance efficiency and lower cost.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
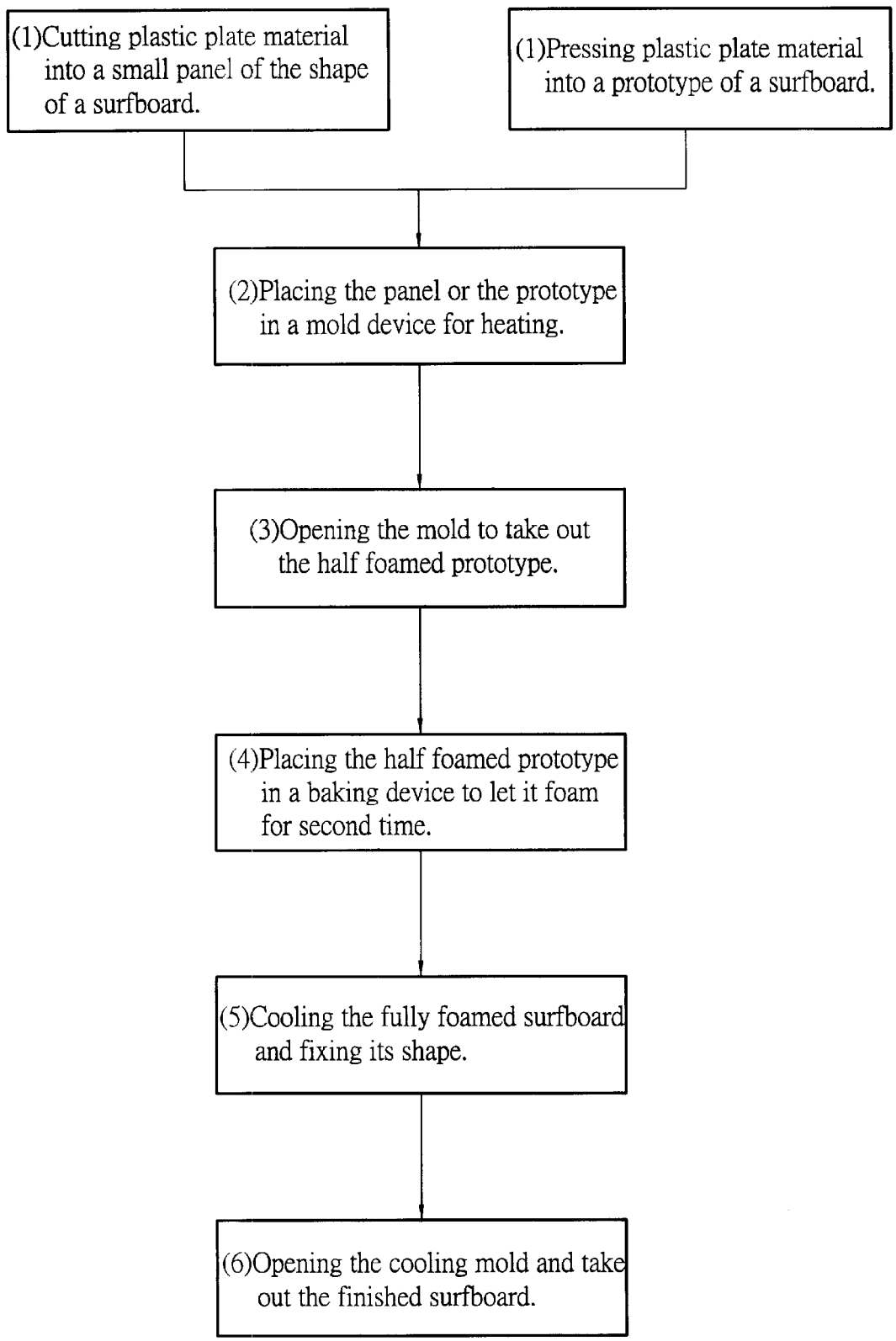
FIG. 1 is a diagram of the flowing chart of a method for making a surfboard.
Figure 2:
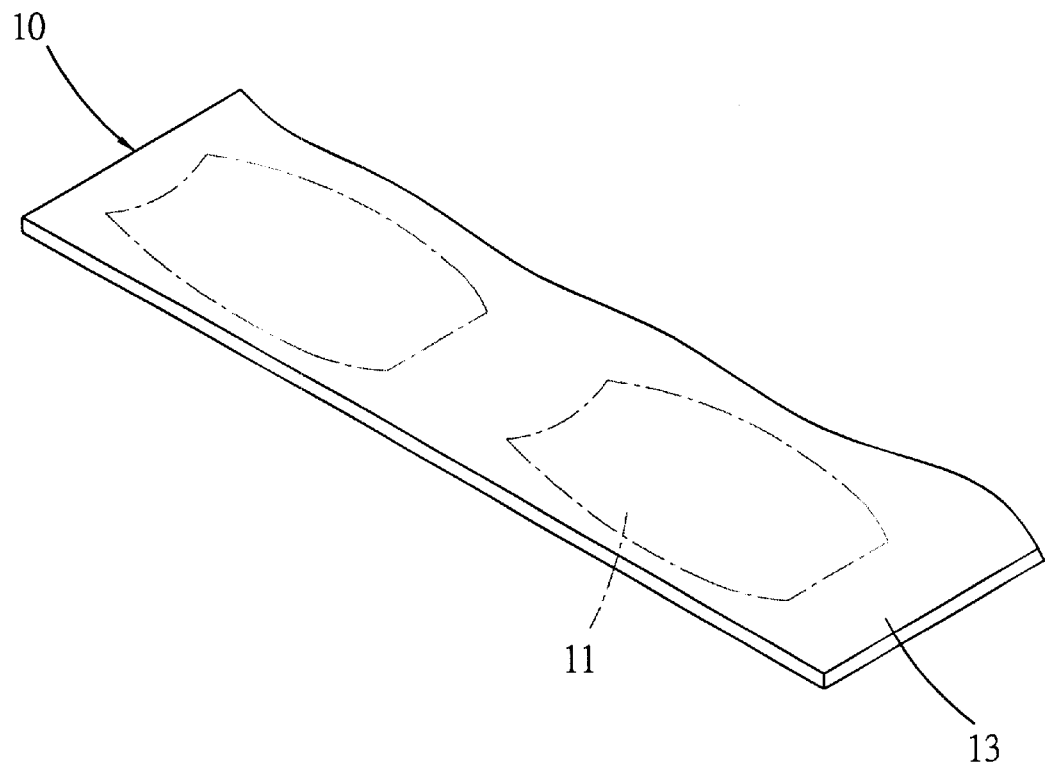
FIG. 2 is a perspective view of a prototype of a surfboard made by the method for making a surfboard in the present invention.
Figure 3:
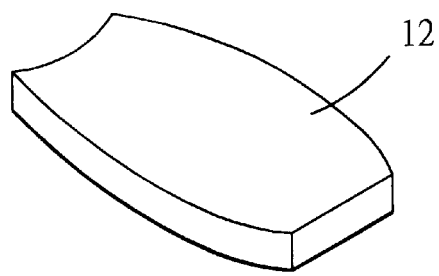
FIG. 3 is a perspective view of a panel for making a surface board made by the method for making a surfboard in the present invention.

A preferred embodiment of a method for making a surfboard in the present invention, as shown in FIGS. 1, 2 and 3, includes six steps of making process.

(1) A first step is to prepare material and cut into panels. Mixing EVA, PE or other mixed plastic, a foam agent, a vulcanizing agent, a filling agent, an auxiliary agent, and pigment in a preset proportion and making a plastic plate-shaped material 10, then as shown in FIG. 2, cutting off a number of small panels 11 to form a prototype of a surfboard by hot pressing and combining process to become integral. Waste side portions 13 of the plastic plate material 10 not yet foamed and vulcanized may be all recycled for use as plastic material 10 once again. Besides, the plastic material 10 may be directly pressed to become a panel 12 as shown in FIG. 3, without producing waste side portions 13, getting rid of material waste and reducing one process of recycling material, shortening making process.

Figure 4:
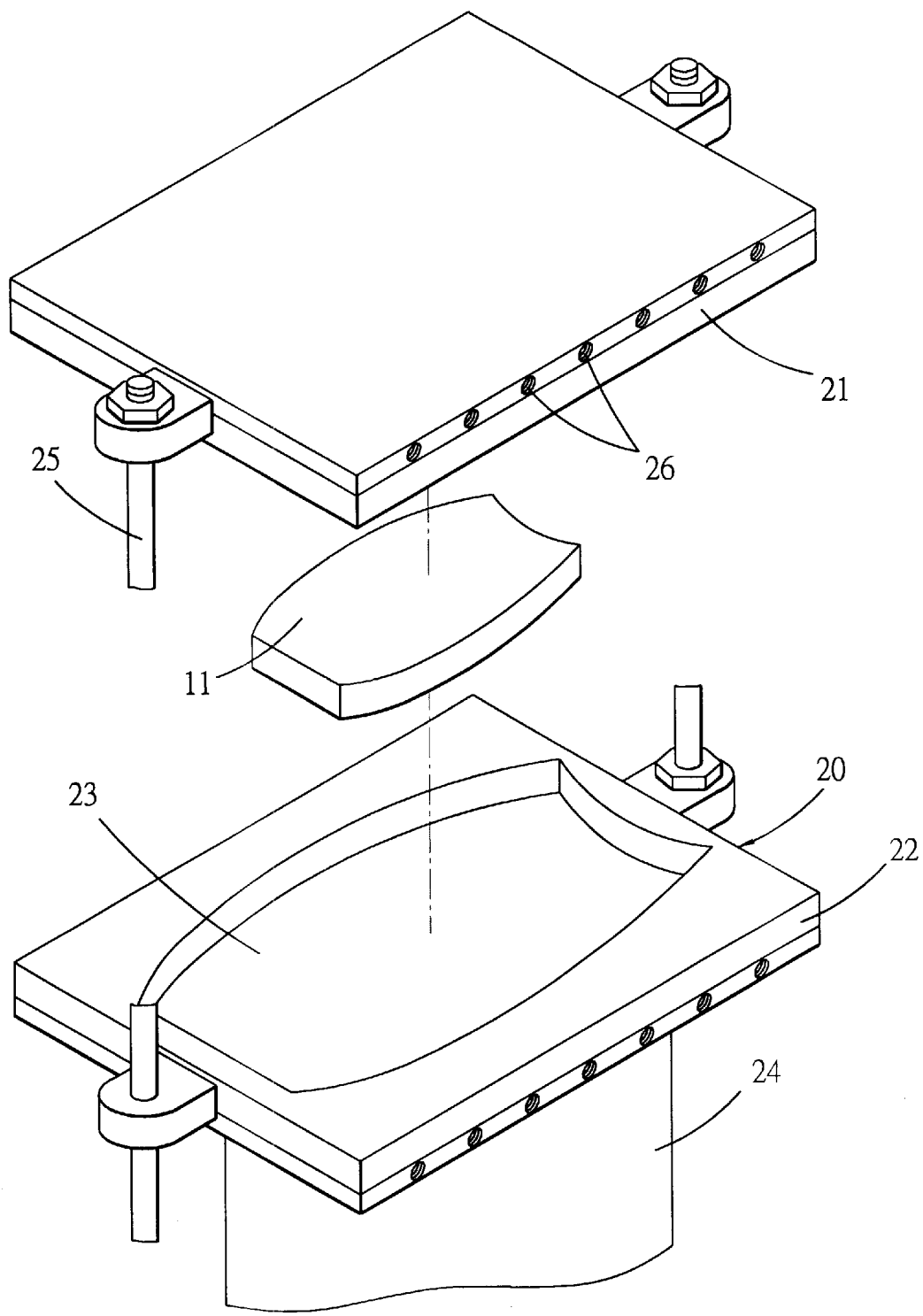
FIG. 4 is an exploded perspective view of a mold device for hot-pressing the panel in the present invention.

(2) A second step is to hotly press the panel in a mold device. The panel 11 is placed in a cavity in the mold device 20 and hot-pressed to foam. As shown in FIG. 4, in this process, there is a mold cavity 23 of a surfboard shape formed in an upper mold 21 and a lower mold 22, and the shape of the mold cavity 23 is made small in proportion of a real size of a finished surfboard. The panel 11 is hot-pressed with the heating temperature in range of 150° C.–170° C., for 30 to 40 minutes to let the foam agent produce foam expansion function. Pressing the mold 20 is performed by a base 24 under the lower mold 22 and a piston rod 25 of an oil pressure cylinder pushing down the upper mold 21. Further, the upper mold 21 and the lower mold 22 have a plurality of holes 26 for sending heat through in the mold or placing a heater therein. But it is a well-known art, omitted here in its details.

Figure 5:
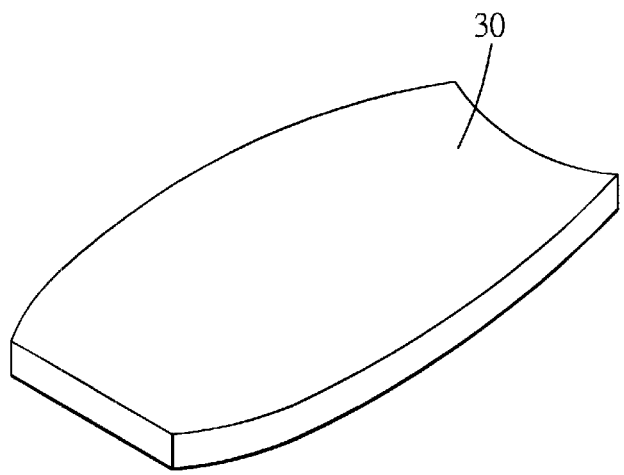
FIG. 5 is a perspective view of a prototype made by the method for making a surfboard in the present invention.

(3) The third step is to take out half foamed panel 30 out of the mold. As shown in FIG. 5, the half foamed panel 30 continues to foam and expand after taken out, to the volume of 6–10 times of that of the panel 11, also forming the prototype of a surfboard.

Figure 6:
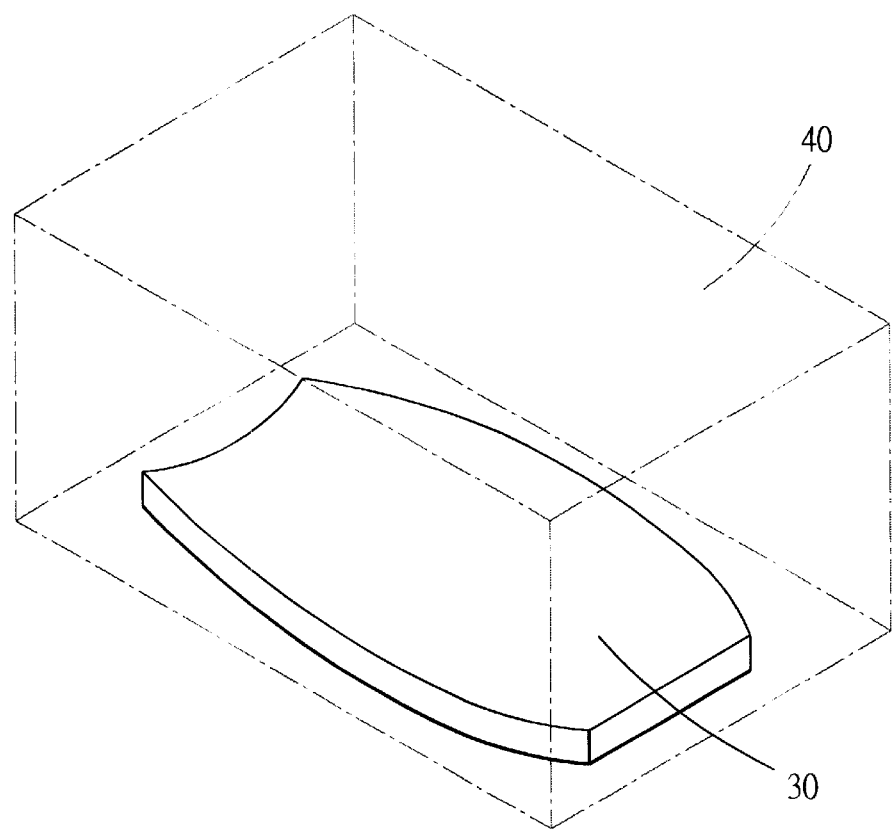
FIG. 6 is a perspective view of the prototype of a surfboard placed in a baking device in the present invention: and, FIG. 7 is a cross-sectional view of a second embodiment of a mold device in the present invention.

(4) The fourth step is to put the prototype finished the third step into a baking device for second time of foaming. As shown in FIG. 6, the half-foamed prototype 30 is placed in a baking device 40, continuing foaming completely, heated in the temperature in the range of 150° C.–200° C. for 10 to 30 minutes, and then taken out of the baking device 40, becoming a completely foamed soft surfboard.

(5) The fifth step is to cooling and hardening the shape of the almost completed surfboard. The completely foamed soft surfboard coming from the fourth step is placed in a cooling mold of cool temperature in the range of 30° C.–60° C. for 10 to 30 minutes.

(6) The sixth step is to open the cooling mold. The cooled surfboard is taken out of the opened cooling mold to become a finished surfboard.

The major technological method of the invention is to cut the plastic plate-shaped material 10 into a small panel 11 or to press the plastic material 10 into a panel 12. Then the panel 11 is placed in a mold cavity 23 in a mold device 20, for hot pressing to foam and become a half-foamed prototype 30. After that, the prototype 30 is heated in a baking device 40 to continue to foam completely, becoming a soft almost finished surfboard. Lastly, the soft almost finished surfboard is cooled in the cooling mold to become a finished surfboard 50 to be taken out of the cooling mold. Therefore, the method for making a surfboard in the invention has less processes than the conventional one of U.S. Pat. No. 5,851, 462, shortening making processes by only needing 10 minutes for second foaming in the baking device in the present invention, saving 20 minutes less than the second foaming in the second mold device of the conventional one, upgrading efficiency.

The second technological method of the invention is to make the half-foamed prototype 30 of a surfboard shape almost as that of a finished surfboard and then to continue to foam in the baking device 40, forming a smooth flow of the making processes.

Figure 7:
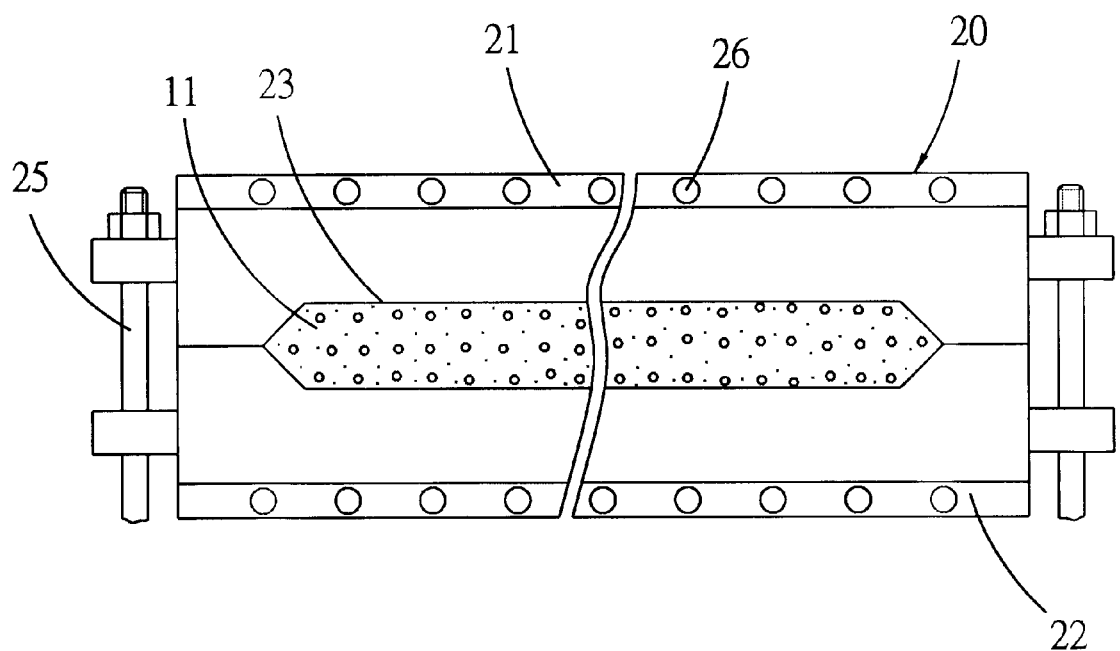

In addition, it is worthy to mention that in the mold 20 in the invention, as shown in FIG. 7, the mold cavity 23 has V-shaped circumferential edges so the that a finished surfboard 50 may have V-shaped side edges to protect the surfboard during surfing.

The surfboard made by the method in the invention has tiny air cells in the interior of the foam body owing to the sealed mold cavity, not sucking water to increase its weight or to produce bad odor by inferior drying as the surfboard made by the conventional method described above. Besides, the inner pressure caused by the inflation of the interior air in the foam body in the invention squeezes the foam body to form a comparatively high-density protective skin on the surface contacting the mold cavity, and the protective skin is not cut at all, holding the complete outer surface and protecting the inner foam body to prolong its service life.

In addition, it is worthy to mention that in the mold 20 in the invention, as shown in FIG. 7, the mold cavity 23 has <-shaped circumferential edges so that a finished surfboard 50 may have <-shaped side edges to protect the surfboard during surfing.

While the preferred embodiment of the invention has been described above, it will be recognized and understood that various modifications may be made therein and the appended claims are intended to cover all such modifications that may fall within the spirit and scope of the invention.

I claim:

1. A method of making a surfboard comprising the steps of:

a) forming a small panel for making the surfboard from one of ethylene vinyl acetate (EVA) and poly ethylene (PE) foamable material;

b) hotly pressing the panel in a heating mold by placing the panel in a mold cavity having a surfboard shape and bounded by upper and lower mold portions and heating the panel to a temperature between 150° C.–170° C. for between 30 to 40 minutes to partially foam the foamable material of the panel;

c) removing the partially foamed panel from the mold and allowing the panel to continue foaming and expanding until reaching a volume of between 6–10 times greater than an initial volume of the panel;

d) placing the panel in a baking device and baking the panel at a temperature of between 150° C.–200° C. for between 10 and 30 minutes to complete the foaming of the panel;

e) removing the panel from the baking device and placing the panel in a cooling mold at a temperature of between 30° C.–60° C. for between 10 and 30 minutes to cool and harden the panel into a completed surfboard; and, f) removing the completed surfboard from the cooling mold.

2. The method of claim 1 wherein the heating mold cavity has periphery with a V-shaped cross-sectional configuration to form a V-shaped periphery on the panel.

3. The method of claim 1 wherein the small panel is formed by cutting the panel from a sheet of EVA or PE material.

4. The method of claim 1 wherein the small panel is formed by pressing the EVA or PE material.

5. The method of claim 1 wherein the forming of the small panel includes the steps of mixing the EVA or PE material with a foaming agent, a filling agent and a pigment.

* * * * *